(12) United States Patent
Faulkner

(10) Patent No.: US 10,927,879 B2
(45) Date of Patent: Feb. 23, 2021

(54) THREADED COUPLINGS WITH LOCKING

(71) Applicant: Crompton Technology Group Limited, Solihull (GB)

(72) Inventor: Dale V. L. Faulkner, Stourbridge (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 224 days.

(21) Appl. No.: 16/137,917

(22) Filed: Sep. 21, 2018

(65) Prior Publication Data
US 2019/0120278 A1   Apr. 25, 2019

(30) Foreign Application Priority Data
Oct. 20, 2017   (EP) .................................... 17275168

(51) Int. Cl.
F16B 39/04   (2006.01)
F16B 39/06   (2006.01)
F16B 39/12   (2006.01)

(52) U.S. Cl.
CPC .............. *F16B 39/06* (2013.01); *F16B 39/04* (2013.01); *F16B 39/12* (2013.01)

(58) Field of Classification Search
CPC ................................. F16B 39/06; F16B 39/04
USPC ........................................................ 411/221
See application file for complete search history.

(56) References Cited

U.S. PATENT DOCUMENTS

| 385,641 | A | * | 7/1888 | Partridge |
| 1,194,060 | A | * | 8/1916 | Oberdier ................. F16B 39/06 411/217 |
| 2,821,419 | A | | 1/1958 | Walton |
| 2,956,604 | A | | 10/1960 | Crotty |
| 3,704,904 | A | | 12/1972 | Rizzone |
| 4,092,080 | A | | 5/1978 | Bradley, Jr. |

(Continued)

FOREIGN PATENT DOCUMENTS

CN   103644189 A   3/2014
CN   203889057 U   10/2014
(Continued)

OTHER PUBLICATIONS

Cohen, M. "The Locking Device Dilemma", Machine Design, Penton Media, Cleveland, OH, US. vol. 66, No. 22, Nov. 21, 1994, p. 92, 94, 96.

(Continued)

*Primary Examiner* — Gary W Estremsky
(74) *Attorney, Agent, or Firm* — Cantor Colburn LLP

(57) ABSTRACT

A threaded coupling is provided that comprises a first coupling member, comprising a cylindrical portion which is internally threaded around an axis of rotational symmetry of the cylindrical portion and comprises an open end that defines an opening having an annular rim; a second coupling member comprising an externally threaded portion and at least one key cavity; and a locking assembly. The locking assembly comprises a lock pin and a lock nut. The externally threaded portion is arranged to be received through the opening to be threadedly engaged with the internally threaded cylindrical portion to couple the first coupling member to the second coupling member. The rim comprises at least one projection that projects in a generally axial direction parallel to the axis of rotational symmetry of the cylindrical portion.

13 Claims, 10 Drawing Sheets

(56) References Cited

U.S. PATENT DOCUMENTS

| | | | |
|---|---|---|---|
| 4,232,978 A * | 11/1980 | Cohen | F16B 7/06 403/317 |
| 4,274,754 A * | 6/1981 | Cohen | F16B 39/04 403/14 |
| 4,423,992 A * | 1/1984 | Ankeny | F16B 39/06 411/221 |
| 4,917,003 A | 4/1990 | Kollross | |
| 4,969,388 A | 11/1990 | Kolhoff et al. | |
| 5,116,178 A | 5/1992 | Lerman et al. | |
| 5,468,103 A | 11/1995 | Leeson | |
| 5,951,222 A | 9/1999 | Gosling | |
| 6,048,151 A * | 4/2000 | Kwee | F16B 39/06 411/217 |
| 7,179,011 B1 * | 2/2007 | Cohen | F16B 7/06 403/315 |
| 7,788,993 B2 * | 9/2010 | Wood | B64C 1/06 280/93.51 |
| 8,622,671 B2 * | 1/2014 | Gagneur | F16B 39/108 403/315 |
| 8,679,275 B2 | 3/2014 | Schalla et al. | |
| 8,733,510 B2 | 5/2014 | Haase | |
| 8,992,148 B2 * | 3/2015 | Schafer | H01R 13/622 285/92 |
| 2020/0056648 A1 | 2/2020 | Faulkner | |

FOREIGN PATENT DOCUMENTS

| | | |
|---|---|---|
| GB | 607745 | 9/1948 |
| KR | 20120057380 A | 6/2012 |
| WO | 0011359 A1 | 3/2000 |

OTHER PUBLICATIONS

European Search Report for Application No. 18275126.3, dated Nov. 14, 2018, 11 pages.
Extended European Search Report for International Application No. 17275168.7 filed Apr. 18, 2018, 7 pages.

* cited by examiner

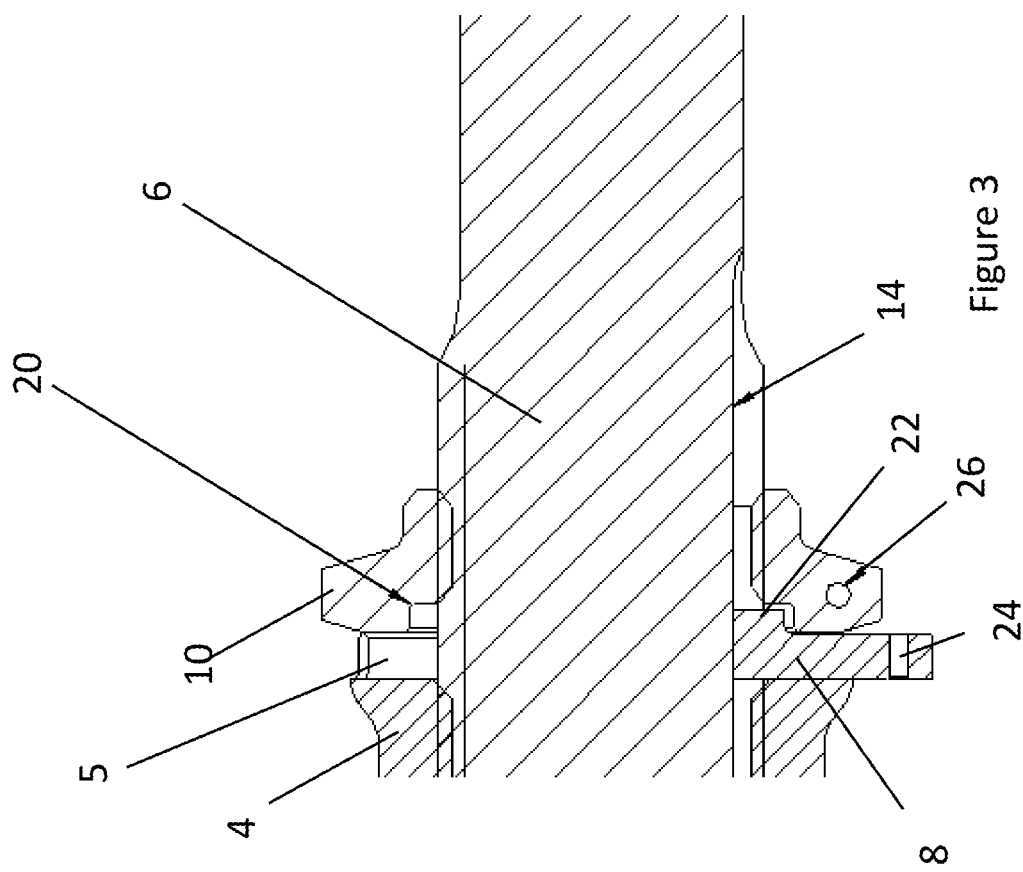
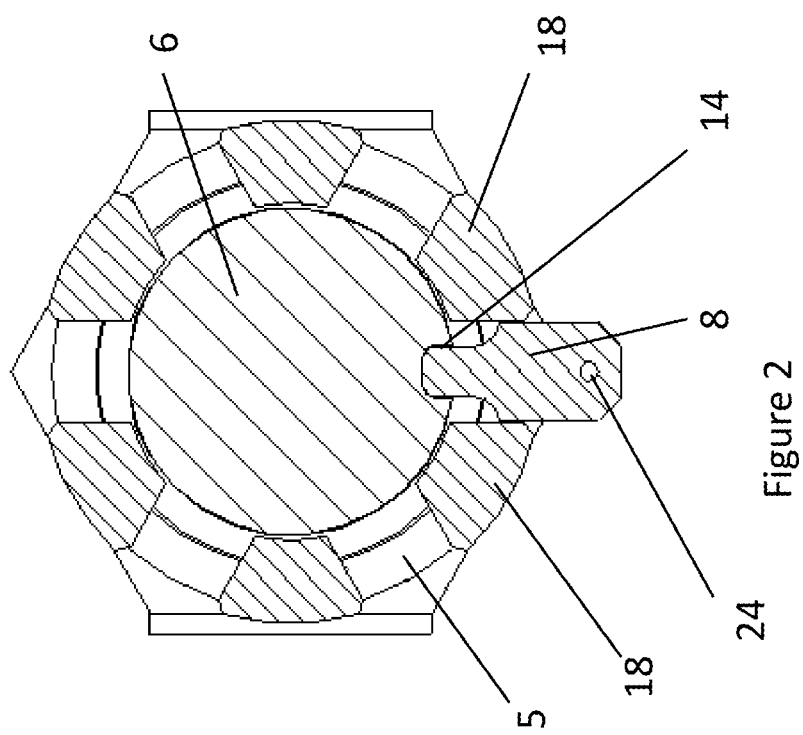

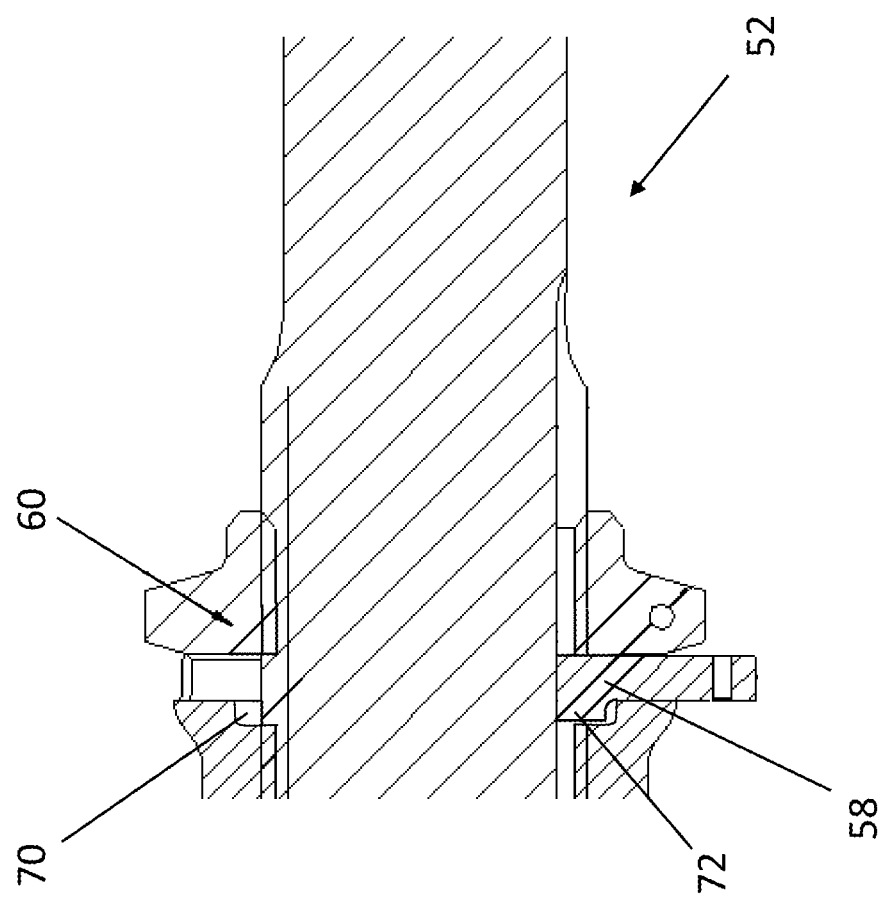

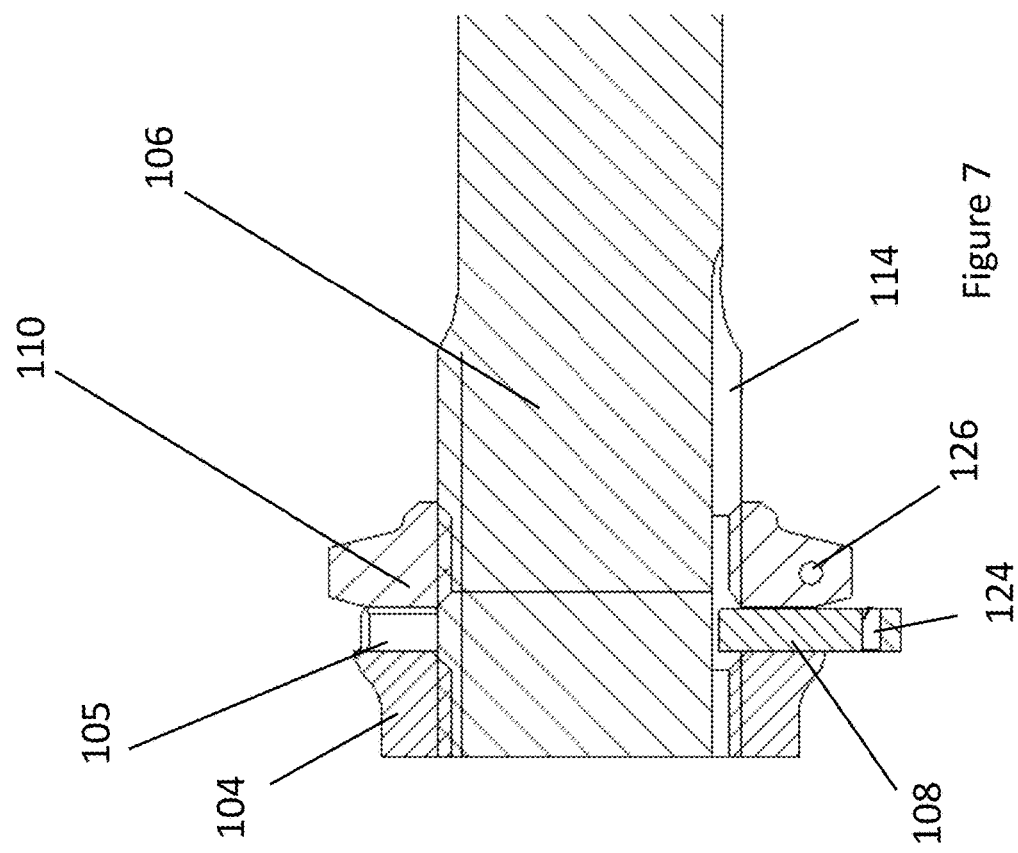
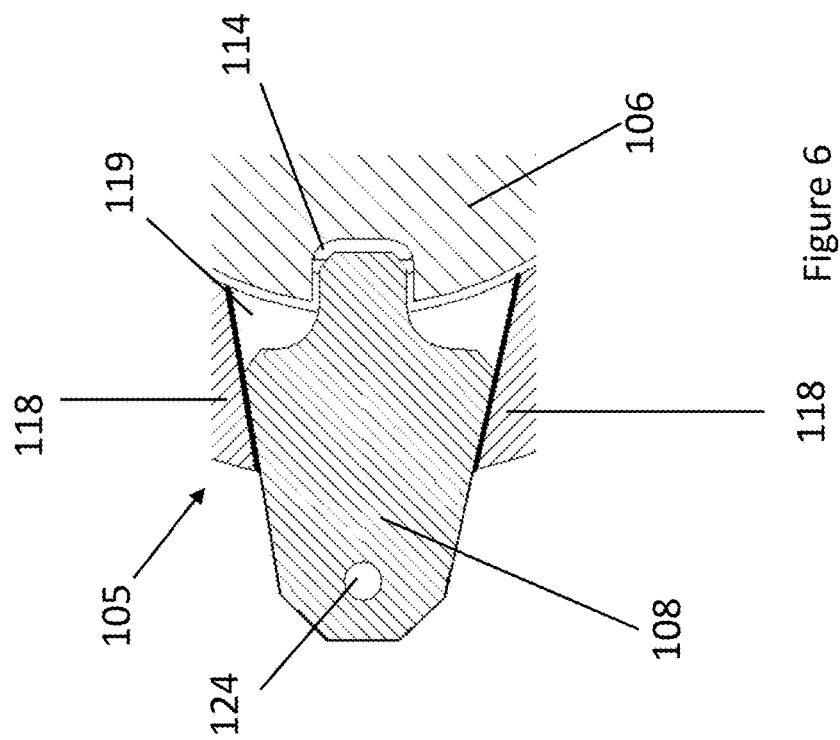

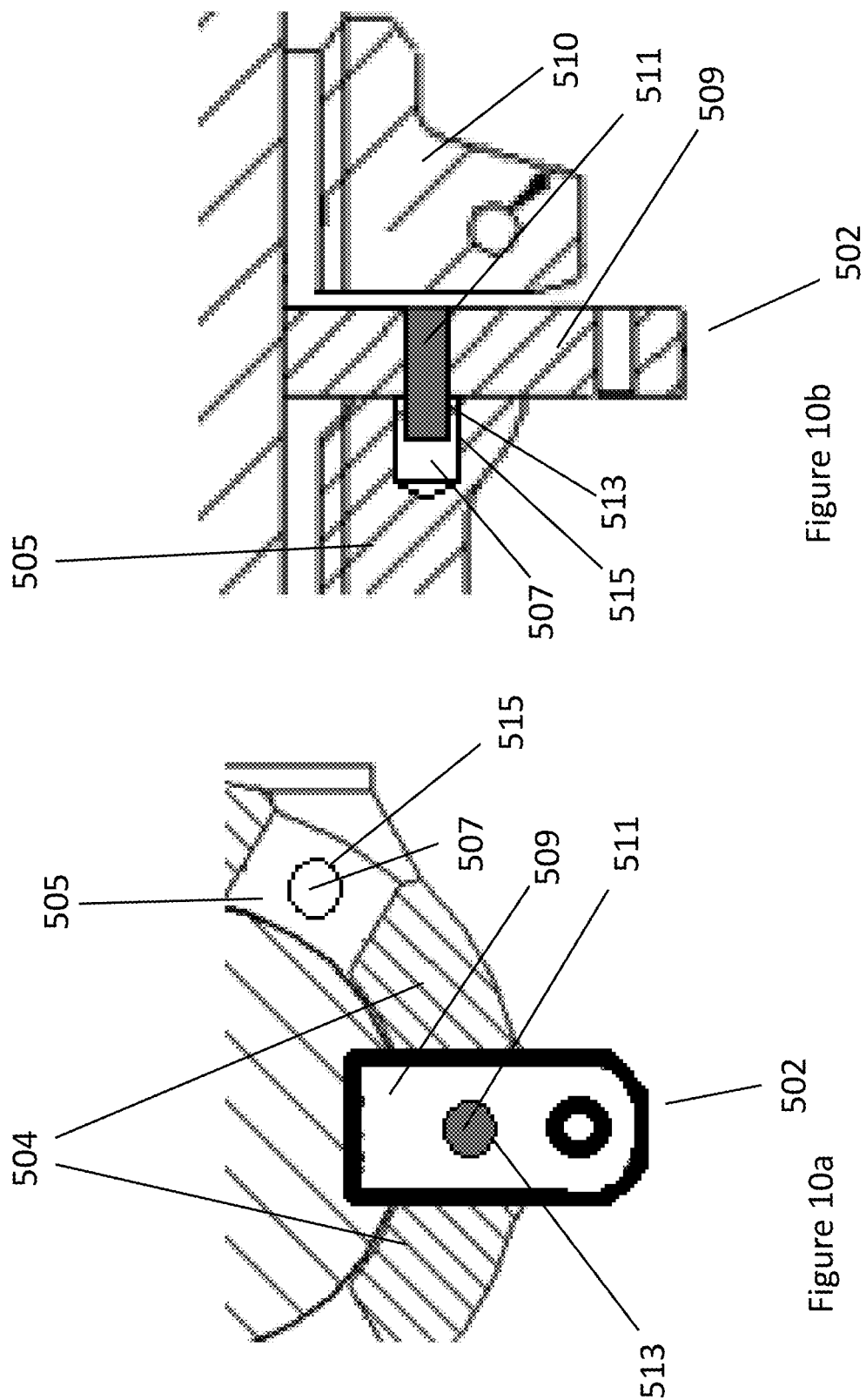

THREADED COUPLINGS WITH LOCKING

FOREIGN PRIORITY

This application claims priority to European Patent Application No. 17275168.7 filed Oct. 20, 2017, the entire contents of which is incorporated herein by reference.

TECHNICAL FIELD

The present disclosure relates to threaded couplings, particularly threaded couplings comprising a locking assembly.

BACKGROUND

Threaded couplings, comprising an externally threaded member and an internally threaded member, which are threadedly engageable, are often used at joints within mechanical systems to provide for rotational and length adjustment of the joint. This may be useful, for example, where final assembly of the system takes place at a different location to the production of the component parts. The length and angular position of the joint can be adjusted by rotating the members relative to one another. In some mechanical systems, the setting of the relative angular position of the members is referred to as timing.

At least in the aerospace industry, a locking assembly is typically provided for the threaded coupling, which prevents further rotation (and therefore changes in length) once the correct angle and length has been achieved. It is required in many scenarios to prevent the threaded coupling from rotating further (and therefore changing its length) once the correct angle and length have been achieved. This is referred to as locking, and is typically achieved using a lock washer and a keyway cut into the externally threaded member. The lock washer features a key which projects radially inwards to engage with the keyway, along with a radial rib that engages with the internally threaded member. A lock nut then secures the washer in place such that it cannot be disengaged, ensuring that the relative position of the two threaded members is fixed. An example of such a locking assembly is seen in U.S. Pat. No. 4,423,992.

Typical locking assemblies as described above comprise bulky components, and in weight sensitive applications, such as in the aerospace industry, additional weight is highly undesirable. In addition, typical locking assemblies can considerably increase the length of a threaded coupling.

The present disclosure seeks to address these shortcomings by providing a threaded coupling comprising a secure locking assembly with reduced length and weight.

According to the present disclosure there is provided a threaded coupling comprising: a first coupling member, comprising a cylindrical portion which is internally threaded around an axis of rotational symmetry of the cylindrical portion and comprises an open end that defines an opening having an annular rim; a second coupling member comprising an externally threaded portion and at least one key cavity; and a locking assembly comprising: a lock pin; and a lock nut; wherein: the externally threaded portion is arranged to be received through the opening to be threadedly engaged with the internally threaded cylindrical portion to couple the first coupling member to the second coupling member; the rim comprises at least one projection that projects in a generally axial direction parallel to the axis of rotational symmetry of the cylindrical portion; the lock pin is arranged to, when the first coupling member is coupled to the second coupling member, be seated in contact with the at least one projection and extend into the at least one key cavity; the lock nut is arranged to be threaded onto the second coupling member to restrict movement of the lock pin in the axial direction; and the lock pin comprises a first engagement surface which is arranged, when the lock pin is seated, to engage a second engagement surface provided by the lock nut or the rim so as to prevent movement of the lock pin in a radial direction, perpendicular to the axial direction.

Thus it will be seen by those skilled in the art that, in accordance with the disclosure, a threaded coupling is provided that requires less material and is more space efficient while still providing effective locking and timing. This results in weight and cost savings as well as enabling the coupling to be used in space limited locations.

A lock pin is distinguished from any other example of lock means, for example a lock washer, by its ability to be removed from the assembled threaded coupling without separating the first and second coupling members. Accordingly the lock pin preferably has an angular extent relative to the cylindrical portion of less than 180°. Further preferably the angular extent of the lock pin is less than 90°, for example 30°, 20° or less than 10°. This enables simpler assembly and repair.

As mentioned above, it is desirable to minimise the total length of the threaded coupling, and as such in preferable examples the at least one projection projects a projection distance in the axial direction, and the lock pin has a thickness in the axial direction when seated, that is less than or equal to the projection distance. Further preferably the lock pin has a thickness in the axial direction when seated, which is equal to the projection distance. This ensures that the lock pin cannot, when seated, move in the axial direction.

The projection distance may be minimised to further reduce the length, although locking torque requirements may define a minimum acceptable projection distance, in that the threaded coupling must remain locked when the first and second coupling members experience a prescribed relative torque. The projection distance is preferably chosen to be the smallest distance that provides the prescribed torque resistance.

In locking assemblies for threaded couplings typical of the prior art, it is only possible to adjust the length of the threaded coupling by rotating the coupling members relative to each other by whole (360°) turns, which for some thread pitches can correspond to a considerable length adjustment. Accordingly, in some examples the first coupling member comprises a plurality of projections, e.g. six or eight, positioned around the rim to form a plurality of gaps between them. In such examples the lock pin may be arranged to be seated at least partially in at least one of these gaps, and in contact with at least one of the projections. This enables the timing of the threaded coupling to be adjusted by angles less than a whole turn and allows the same threaded coupling to be utilised in a variety of different applications that require different timing. In a subset of these examples the lock pin is arranged to be seated in contact with at least two projections. Preferably the plurality of projections are equally sized. In some examples the plurality of projections are equiangularly spaced around the rim of the cylindrical portion, although other spacing patterns are possible.

In some examples the lock pin comprises a slot to accommodate the at least one projection such that when seated, the slot encloses the at least one projection, wherein the first engagement surface comprises the internal surface of the slot, and the second engagement surface comprises the external surface of the at least one projection. This prevents outward radial movement of the lock pin. Preferably, in these examples, the projections have a circular cross sectional profile, although other cross sectional profiles are possible, such as square or elliptical.

In some examples the lock pin comprises a main part, comprising a longitudinally extending through-hole, and a separate securing part arranged to extend at least partially into the longitudinally extending through-hole, and the rim comprises a longitudinally extending cavity, wherein the main part is arranged to be seated in contact with the at least one projection and extend into the at least one key cavity, and the securing part is also arranged to extend at least partially into the longitudinally extending cavity. The securing part may take the form of a pin or dowel, for example. In such examples the securing part comprises the first engagement surface, and the longitudinally extending cavity comprises the second engagement surface. It will be understood that in these examples the main part and the securing part are separable, i.e. a two-part lock pin.

The key cavity may comprise a single radially inwards-extending hole suitable for receiving the lock pin. In some examples the key cavity comprises a keyway extending at least partially along the externally threaded portion. Additionally or alternatively the key cavity comprises a plurality of keyways or cavities, which may be positioned co-linearly or may be angularly offset around the externally threaded portion. The provision of multiple locations in which the lock pin can be seated increases the configurability of the threaded coupling in terms of timing and length adjustment.

In some examples the lock nut comprises an annular groove, which comprises the second engagement surface, and the lock pin comprises a protrusion which, when the lock pin is seated, is positioned within the annular groove and comprises the first engagement surface.

Additionally or alternatively the second engagement portion may comprise an annular groove in the first coupling member. In some examples the lock pin comprises a protrusion which, when the lock pin is seated, is positioned within the annular groove and comprises the first engagement surface.

In some examples where the rim comprises a plurality of projections, at least one of the gaps is tapered, e.g. it is narrower on the radially outward side and wider on the radially inward side. In such examples the lock pin is similarly tapered to fit in the at least one gap, wherein the first engagement surface comprises one side of the lock pin and the second engagement surface comprises a side of one of the plurality of projections. In these examples the lock pin does not require an additional protrusion, and the lock nut does not require an additional annular groove. This decreases the manufacturing complexity and cost of the threaded coupling.

In many applications of threaded couplings, so called secondary locking is required, wherein the lock nut itself must be secured via secondary locking means such that it does not unscrew when subject to, for example, vibrations during use. Accordingly, in some examples the lock nut comprises at least a first through-hole through which lock wire may be threaded; the first coupling member, the second coupling member or the lock pin comprises a second through-hole for lock wire and a lock wire is arranged to be inserted, in use, through the first and second through-holes and secured e.g. such that relative movement of the lock nut and any of the other components of the threaded coupling is not possible. In preferable examples the second through-hole is provided on the lock pin. Further preferably the position of the first and second through-holes is such that a minimum length of lock wire is required.

The threaded coupling described herein is particularly suited for use when connected to a structural component made of fibre reinforced polymer matrix composite material, for example a carbon fibre reinforced polymer (CFRP) rod. As such, in some examples the first coupling member comprises connection means for connecting the first coupling member to a structural component made of fibre reinforced polymer matrix composite material. Preferably the connection means comprises a threaded portion, and the first coupling member is arranged to be screwed onto the end of the structural component. In these examples the at least one projection may serve as a torque application point for screwing the first coupling member onto the structural component. Preferably the at least one projection is shaped so as to receive a standard torque application tool.

The second coupling member may comprise a rod end, a clevis, a blade end, a bush housing or any other suitable component that may require precise timing.

BRIEF DESCRIPTION OF THE DRAWINGS

One or more non-limiting examples will now be described, by way of example only, and with reference to the accompanying figures, in which:

FIG. 2 is a cross sectional view of the threaded coupling according to the first example of the present disclosure;

FIG. 3 is a second cross sectional view of the threaded coupling according to the first example of the present disclosure;

FIG. 4 is a cross sectional view of a threaded coupling according to an example of the present disclosure;

FIG. 6 is a cross sectional view of the threaded coupling according to the second example of the present disclosure;

FIG. 7 is a second cross sectional view of the threaded coupling according to the second example of the present disclosure;

FIGS. 9 and 10a-b are cross sectional views of lock pins according to one or more further examples of the present disclosure;

DETAILED DESCRIPTION

Figure 1:
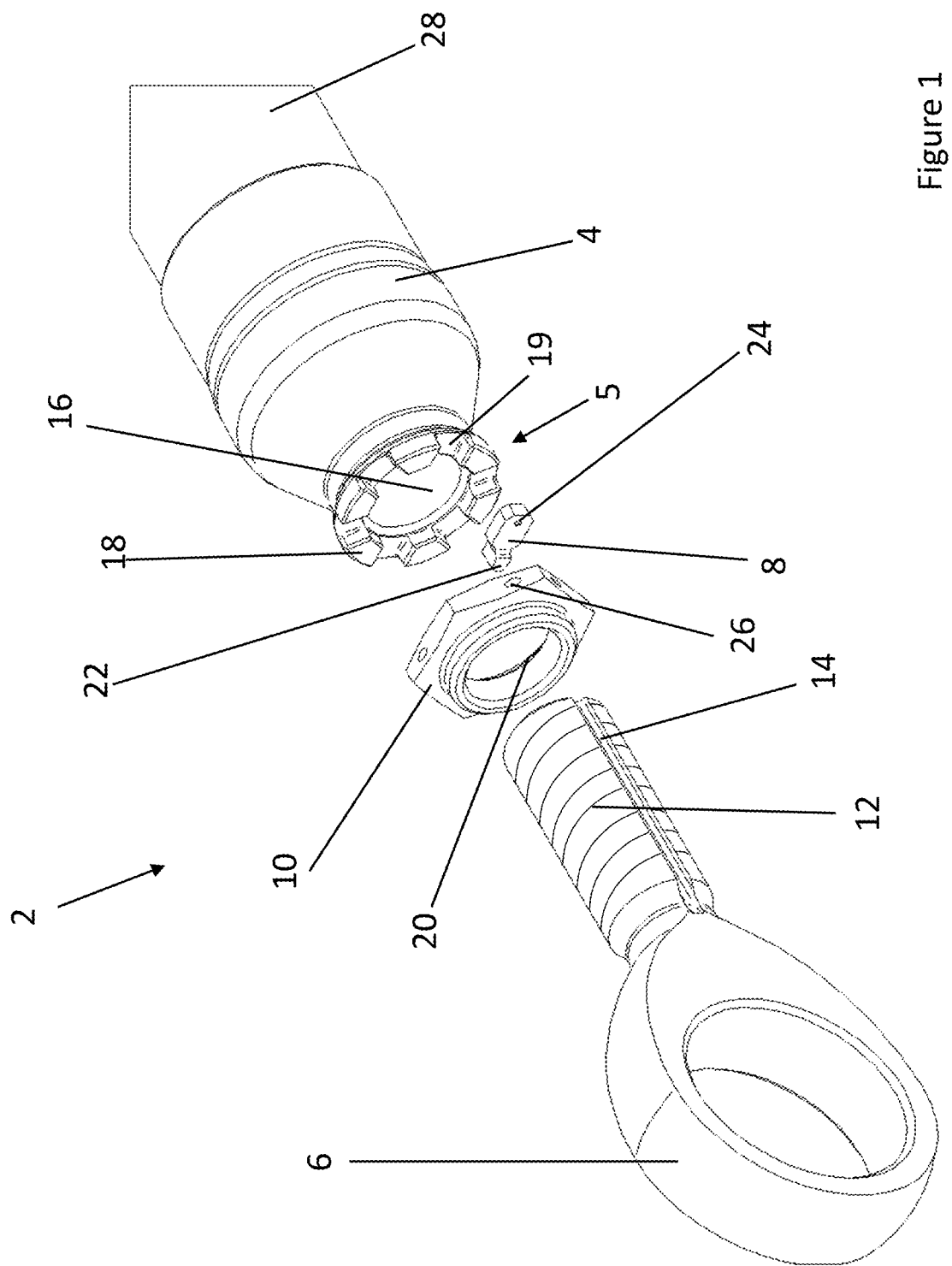
FIG. 1 is an exploded view of a threaded coupling according to a first example of the present disclosure.

FIG. 1 shows a threaded coupling 2 comprising an end fitting 4, a rod end 6, a lock pin 8 and a lock nut 10. The rod end 6 comprises a cylindrical externally threaded portion 12 and a key cavity in the form of a keyway 14, which comprises a groove cut along the externally threaded portion 12. The end fitting 4 comprises a cylindrical internally threaded portion 16 that is threadedly engageable with the externally threaded portion 12.

The end fitting 4 further comprises an annular rim 5 that defines a circular opening through which the externally threaded portion 12 may be inserted to engage with the internally threaded portion 16. The rim 5 comprises a plurality of projections 18 which project in an axial direction parallel to the axis of rotational symmetry of the cylindrical internally threaded portion 16.

In this example the projections 18 are equally sized and evenly spaced around the rim 5 to define a plurality of equally sized gaps 19 between adjacent projections 18.

When assembled, the rod end 6 is coupled to the end fitting 4 through the threadedly engaged internally threaded portion 16 and the externally threaded portion 12. The length of the threaded coupling 2 and the orientation of the rod end 6 with respect to the end fitting 4, also referred to as the timing of the threaded coupling, can be adjusted by rotating the rod end 6 relative to the end fitting 4.

The lock pin 8 is shaped such that it may be seated in one of the gaps 19 between adjacent projections 18, while extending radially (relative to the cylindrical internally threaded portion 16) both inwards past the minimum radial extent of the rim 5 and outwards past the maximum radial extent of the rim 5. When the threaded coupling is assembled, the rod end 6 is orientated relative to the end fitting 4 such that the keyway 14 is aligned with a gap 19, and the lock pin 8 is disposed in this gap 19 as described above such that it extends radially inwards into the keyway 14. When seated in said gap 19 the lock pin 8 is restricted from moving circumferentially by the sides of the projections 18 that define the gap 19.

The keyway 14 has a depth, and the lock pin 8, when seated, extends past the minimum radial extent of the rim 5 by a distance equal to this depth, such that when seated with the rod end 6 in place, the lock pin 8 is prevented from moving radially inwards.

The lock nut 10 comprises an internally threaded surface which is arranged to engage with the externally threaded portion 12 of the rod end 6. When the threaded assembly 2 is assembled, the lock nut 10 is tightened via the threaded engagement with the externally threaded portion 12, onto the rims of the end fitting 4. This restricts the axial movement of the lock pin 8, which is disposed in one of the gaps 19 between two of the projections 18 as detailed above.

Figure 12:
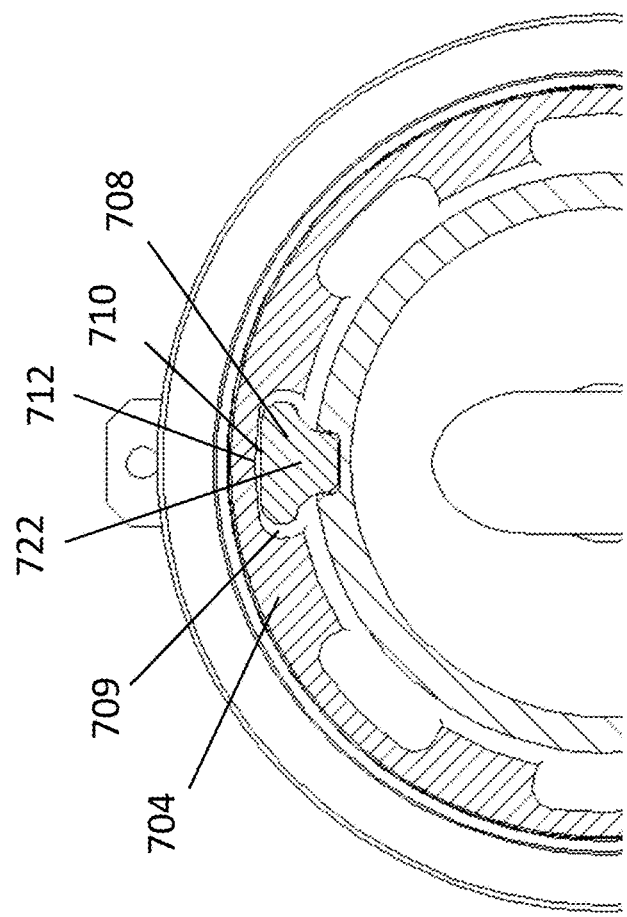
FIGS. 11 and 12 are cross sectional views of lock pin protrusion profiles according to one or more examples of the present disclosure.
Figure 11:
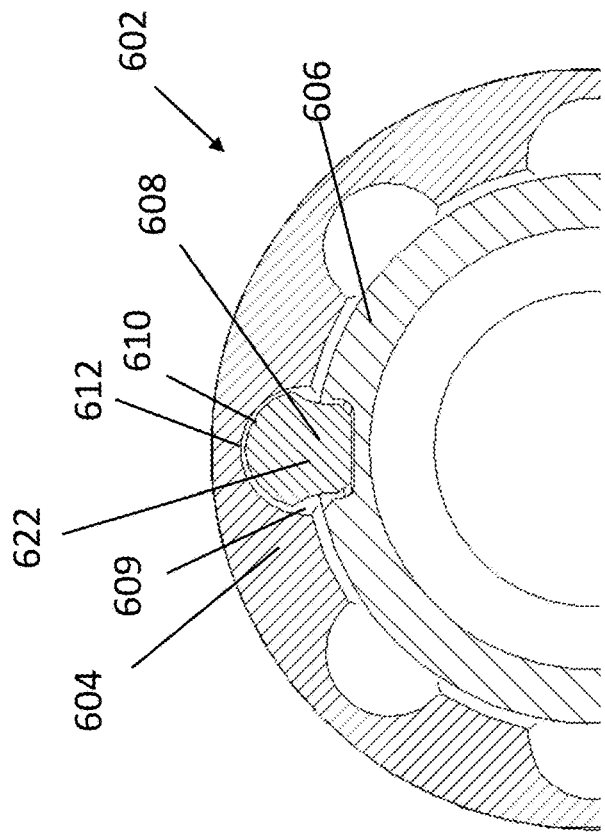

The lock nut 10 further comprises an annular groove 20 located on the end of the internally threaded surface nearest the end fitting 4. The lock pin 8 comprises an axially extending protrusion 22 arranged to sit in the annular groove 20 when the threaded coupling 2 is assembled. Engagement of the annular groove 20 and the protrusion 22 restricts outward radial movement of the lock pin 8. Some alternative profiles for the lock pin protrusion 22 are illustrated in FIGS. 11 and 12 and described in more detail below.

The disposal of the lock pin 8 within the keyway 14, and its aforementioned restriction on movement in the circumferential direction, prevents the relative rotation of the rod end 6 and the end fitting 4. This ensures that it is not possible to change the length of the threaded coupling 2 or adjust its timing while the lock pin 8 is seated. In other words the threaded coupling 2 is locked in position. The plurality of projections 18 define a plurality of gaps 19, and the lock pin 8 may be disposed within any of these gaps 19 to enable the timing and length of the threaded coupling 2 to be adjusted by fractions of a whole turn. In this example there are six projections 18 defining six gaps 19, with a 60° angular separation between them. This allows the timing of the threaded coupling 2 to be adjusted in steps of 60°.

For a typical thread angle of 60°, and a typical diameter of the threaded portions 12, 16 of 25.4 mm, the length of the threaded coupling 2 may be adjusted in steps of 2.12 mm. Of course other thread angles and diameters of the threaded portions 12, 16 are possible To adjust the length or timing of the threaded coupling 2 once assembled, the lock nut 10 must be retracted from its position against the rim 5 a distance such that the lock pin 8 may be extracted. The minimum retraction distance for which extraction is possible is equal to the axial depth of the annular groove 20, which may be significantly less than the axial thickness of the projections 18.

The threaded coupling 2 described herein also provides for secondary locking, such that the lock nut 10 cannot, for example due to vibrations, become, during use, loosened a sufficient distance such that the lock pin 8 becomes disengaged and the threaded coupling 2 becomes unlocked. The provision of secondary locking is of particular use in, for example, the aerospace industry, where vibrations are common and it is vital that components do not become unsecured during use.

Figure 13:
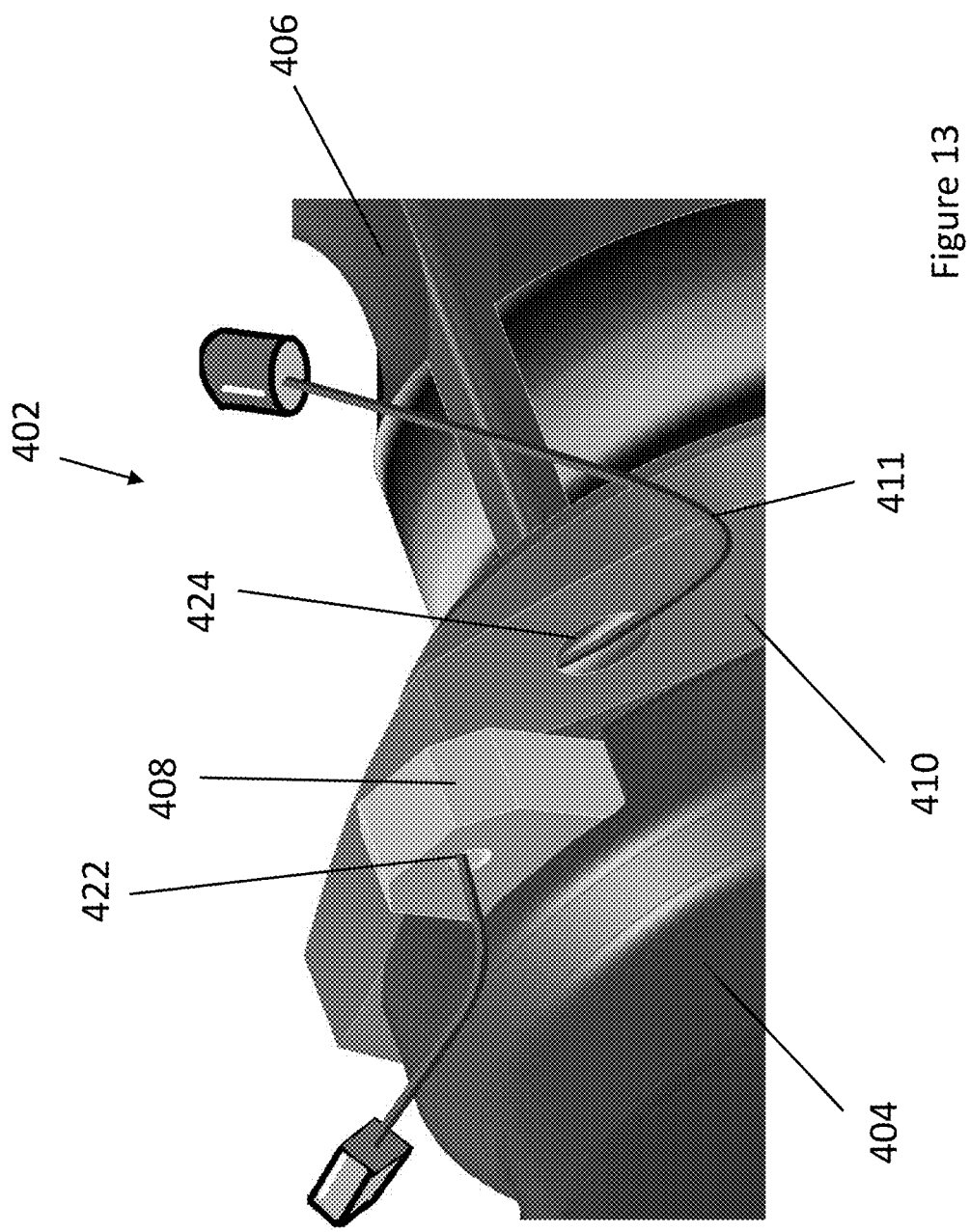
FIG. 13 illustrates a fully assembled threaded coupling according to one or more examples of the present disclosure.

To provide this secondary locking, the lock pin 8 comprises a first through-hole 24, and the lock nut 10 comprises a second through-hole 26. Once the threaded coupling 2 has been assembled, a lock wire (not shown) is inserted through the first and second through-holes 24, 26, pulled taut and secured (e.g. using crimp ferrules). The lock nut 10 is therefore prevented from loosening, as any attempt to unwind the lock nut 10 pulls the lock wire in tension against the lock pin 8. A diagram of an assembled threaded coupling 2 with lock wire providing secondary locking is shown in FIG. 13.

In the example of FIG. 1, the threaded coupling 2 is connected to a carbon fibre reinforced polymer (CFRP) rod 28, via the end fitting 4. An internally threaded connection portion at the opposite end of the end fitting 4 to the annular rim 5 (not shown) provides connection means to connect the end fitting 4 to the CFRP rod 28. During assembly, the end fitting 4 is threaded onto the CFRP rod 28 by applying a torque to the end fitting 4. Before the threaded coupling 2 is assembled, the projections 18 provide a torque application point with which any suitable torque application tool, e.g. a C spanner (not shown), may be used to drive the end fitting 4 onto the CFRP rod 28. The threaded coupling 2 therefore provides coupling with adjustable length and timing between the rod end 6 and the CFRP rod 28.

FIG. 2 is a cross sectional view of the assembled threaded coupling 2 in a plane perpendicular to the axis of rotational symmetry of the cylindrical internally threaded portion 16, cutting through the rim 5 and lock pin 8. The lock pin 8 is seated between two projections 18 such that it extends into the keyway 14 of the rod end 6 and extends radially outwards from the rim 5. The first through-hole 24 is shown in the lock pin 8 at a point radially external to the rim 5.

The sides of the lock pin 8 are in contact with the sides of the projections 18 and are parallel, enabling radial insertion and extraction of the lock pin 8. The rod end 6 is prevented from rotating relative to the rim 5 due to the extension of the lock pin 8 into the keyway 14 and the lock pin 8 being in contact with the projections 18.

FIG. 3 is a cross sectional view of the assembled threaded coupling 2 in a plane parallel to the axis of rotational symmetry of the cylindrical internally threaded portion 16, cutting through the centre of lock pin 8. The lock nut 10 is tightened against the rim 5 and the lock pin 8 to prevent axial movement of the lock pin 8 and the axially extending protrusion 22 extends into the annular groove 20 to prevent outward radial movement of the lock pin 8. The lock pin 8 extends the entire depth of the keyway 14, such that inward radial movement is prevent.

The first through-hole 24 and second through-hole 26 are positioned proximally, such that a minimum length of lock wire (not shown) may be used to provide secondary locking to the threaded coupling.

While in this example outward radial movement of the lock pin 8 is prevented through engagement of the protrusion 22 of the lock pin 8 and the annular groove 20 on the lock nut 10, in some alternative examples, outward radial movement of a lock pin may be prevented through engagement of a similar protrusion with an annular groove on the end fitting itself.

FIG. 4 illustrates a cross sectional view of such an alternative assembled threaded coupling 52 which comprises an end fitting 54 in which an annular groove 70 is disposed. In a similar manner to the previous example, a lock pin 58 comprises an axially extending projection 72 that extends into the annular groove 70 to prevent outward radial movement of the lock pin 58. In this example a specially manufactured lock nut comprising an annular groove is not required and a standard lock nut 60 may be used instead to secure the assembly 52.

Figure 5:
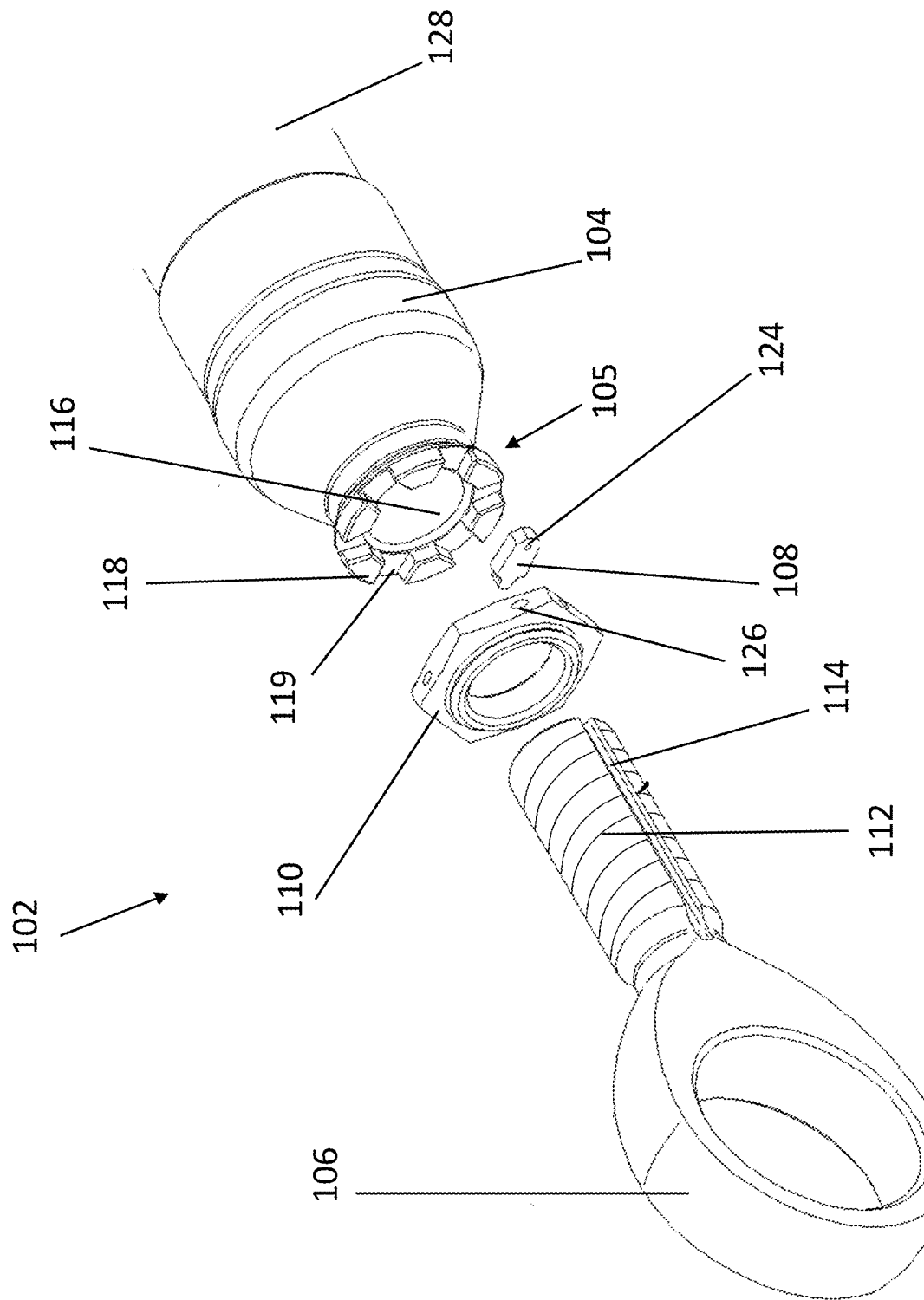
FIG. 5 is an exploded view of a threaded coupling according to a second example of the present disclosure.

FIG. 5 shows an alternative example of a threaded coupling 102 comprising an end fitting 104, a rod end 106, a lock pin 108 and a lock nut 110. The rod end 106 comprises a cylindrical externally threaded portion 112 and a keyway 114, which comprises a groove cut along the externally threaded portion 112. The end fitting 104 comprises a cylindrical internally threaded portion 116 that is threadedly engageable with the externally threaded portion 112.

The end fitting 104 further comprises an annular rim 105 that defines a circular opening through which the externally threaded portion 112 may be inserted to engage with the internally threaded portion 116. The rim 105 comprises a plurality of projections 118 which project in an axial direction parallel to the axis of rotational symmetry of the cylindrical internally threaded portion 116.

The projections 118 are equally sized and evenly spaced around the rim 105 to define a plurality of equally sized gaps 119 between adjacent projections 118. The projections 118 are tapered, such that the gaps 119 extend from a wider radially innermost opening to a narrower radially outermost opening (see also FIG. 6).

When assembled, the rod end 106 is coupled to the end fitting 104 through the threadedly engaged internally threaded portion 116 and the externally threaded portion 112. The length of the threaded coupling 102 and the orientation of the rod end 106 with respect to the end fitting 104, also referred to as the timing of the threaded coupling, can be adjusted by rotating the rod end 106 relative to the end fitting 104.

The lock pin 108 is shaped such that it may be seated in one of the tapered gaps 119 between adjacent projections 118, while extending radially (relative to the cylindrical internally threaded portion 116) both inwards past the minimum radial extent of the rim 105 and outwards past the maximum radial extent of the rim 105. When the threaded coupling 102 is assembled, the rod end 106 is orientated relative to the end fitting 104 such that the keyway 114 is aligned with a gap 119, and the lock pin 108 is disposed in this gap 119 as described above such it extends radially inwards into the keyway 114. When seated in said gap 119 the lock pin 108 is restricted from moving circumferentially by the sides of the projections 118 that define the gap 119.

The lock pin 108 is tapered to match the tapered shape of the gaps 119, such that when seated, it is restricted from moving radially outwards.

The keyway 114 has a depth, and the lock pin 108, when seated, extends past the minimum radial extent of the rim 105 by a distance equal to this depth, such that when seated with the rod end 106 in place, the lock pin 108 is prevented from moving radially inwards.

The lock nut 110 comprises an internally threaded surface which engages with the externally threaded portion 112 of the rod end 106. When the threaded assembly 102 is assembled, the lock nut 110 is tightened via the threaded engagement with the externally threaded portion 112, onto the rim 105 of the end fitting 104. This restricts the axial movement of the lock pin 108, which is disposed in the gap 119 between two of the projections 118 as detailed above.

In contrast to the example illustrated by FIGS. 1-3, the lock nut 110 does not require an annular groove, and the lock pin 108 does not require an additional protrusion, as the radial retention of the lock pin 108 is provided via the tapering nature of the gaps between adjacent projections 118. This reduces the manufacturing complexity of the lock nut 110 and the lock pin 108.

The lock pin 108 locks the threaded coupling 102 in the same way as described with relation to FIG. 1. As for the example illustrated in FIG. 1, the timing of the threaded coupling 102 may be adjusted in steps of 60° and for a typical thread angle of 60°, and a typical diameter of the threaded portions 112, 116 of 25.4 mm, the length of the threaded coupling 102 may be adjusted in steps of 2.12 mm. Of course other thread angles and diameters of the threaded portions 112, 116 are possible.

To adjust the length or timing of the threaded coupling 102 once assembled, the lock nut 110 must be retracted from its position against the rim 105 a distance such that the lock pin 108 may be extracted. The minimum retraction distance for which extraction is possible is equal to the axial thickness of the lock pin 108, because due to the tapering nature of the lock pin 108 and the gaps 119 between adjacent projections 118, the lock pin 108 cannot be extracted radially from the gap 119 in which it is seated. Instead, it must be lifted axially out of the gap 119, requiring a space above the rim 105 equal to its axial thickness.

The lock pin 108 comprises a first through-hole 124 and the lock nut 110 comprises a second through-hole 126, to provide for secondary locking via a lock wire (not shown), as described for the first example.

Similarly to in the first example, the threaded coupling 102 is connected to a carbon fibre reinforced polymer (CFRP) rod 128, via an internally threaded connection portion of the end fitting 104. As in the first example, the projections 118 provide a torque application point with which any suitable torque application tool, e.g. a C spanner (not shown), may be used to drive the end fitting 104 onto the CFRP rod 128. The threaded coupling 102 therefore provides coupling with adjustable length and timing between the rod end 106 and the CFRP rod 128.

FIG. 6 is a close up cross-sectional view of the assembled threaded coupling 102 in a plane perpendicular to the axis of rotational symmetry of the cylindrical internally threaded portion 116, cutting through the rim 105 and lock pin 108. The lock pin 108 is seated between two projections 118 such that it extends into the keyway 114 of the rod end 16 and extends radially outwards from the rim 105. The first through-hole 124 is shown in the lock pin 108 at a point radially external to the rim 105.

The tapering nature of the sides of the projections 118 is seen clearly in FIG. 6. The sides of the lock pin 108 are in contact with the sides of both of the projections 118, preventing any outward radial movement of the lock pin 108. The rod end 106 is prevented from rotating relative to the rim 105 due to, similarly to the first example, the extension of the lock pin 108 into the keyway 114 and the lock pin 108 being in contact with the projections 118.

FIG. 7 is a cross sectional view of the assembled threaded coupling 102 in a plane parallel to the axis of rotational symmetry of the cylindrical internally threaded portion 116, cutting through the centre of lock pin 108. The lock nut 110 is tightened against the rim 105 and the lock pin 108 to prevent axial movement of the lock pin 108.

As in the first example, the first through-hole 124 and second through-hole 126 are positioned proximally, such that a minimum length of lock wire (not shown) may be used to provide secondary locking to the threaded coupling.

Figure 8B:
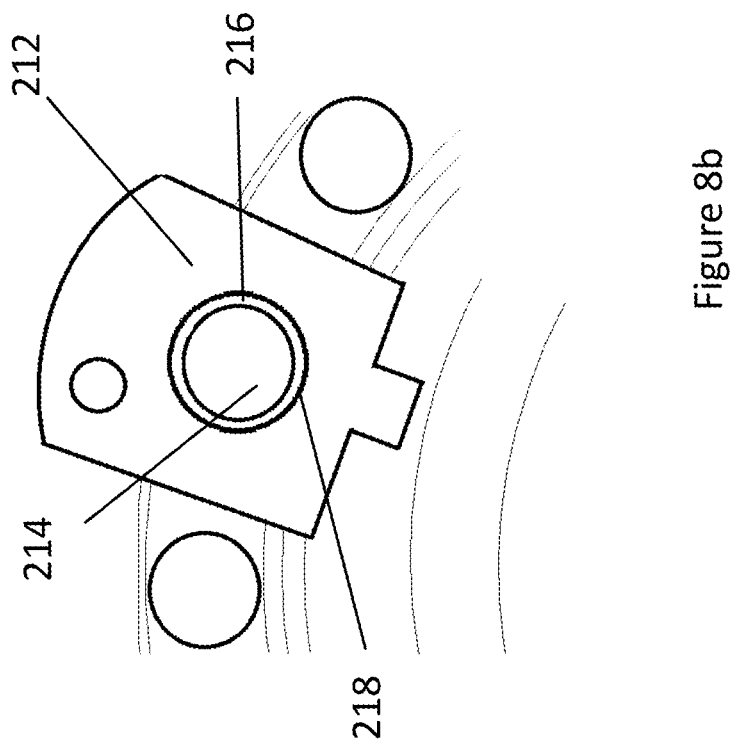
FIGS. 8a and 8b are cross sectional views of lock pins according to one or more further examples of the present disclosure.
Figure 8A:
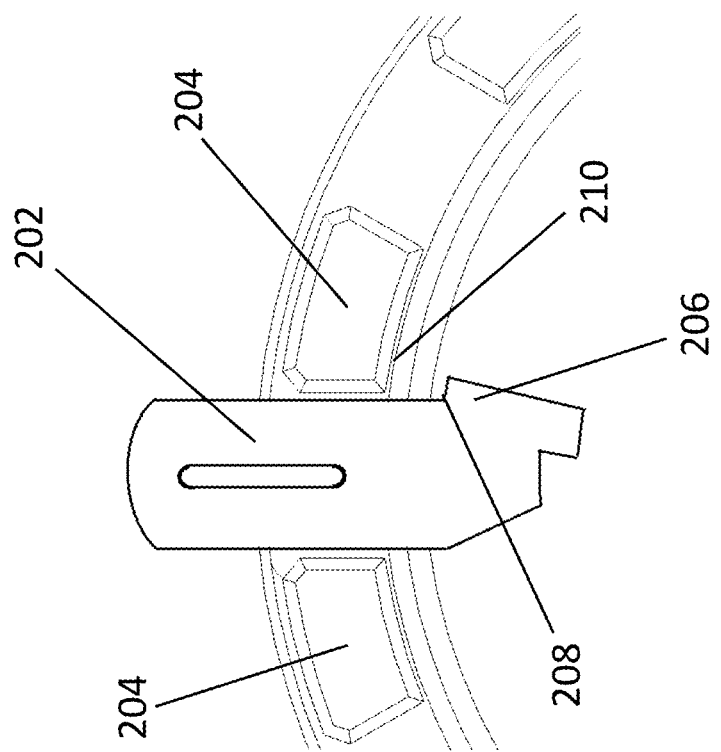

FIG. 8a is a cross sectional view of a lock pin 202 seated between two projections 204. The lock pin 202 comprises two parallel sides along with a circumferentially extending lip 206. The lip 206 is located radially inwards of the projections 204 and comprises an engagement surface 208 which engages with a radially inner side of one of the projections 210 to prevent radially outward movement of the lock pin 202.

FIG. 8b is a cross-sectional view of another lock pin 212, comprising a circular slot 216 that encloses a circular projection 214. The slot 216 comprises an inner surface 218 that engages with an exterior surface of the projection 214 and prevents radial or circumferential movement of the lock pin 212.

Figure 9:
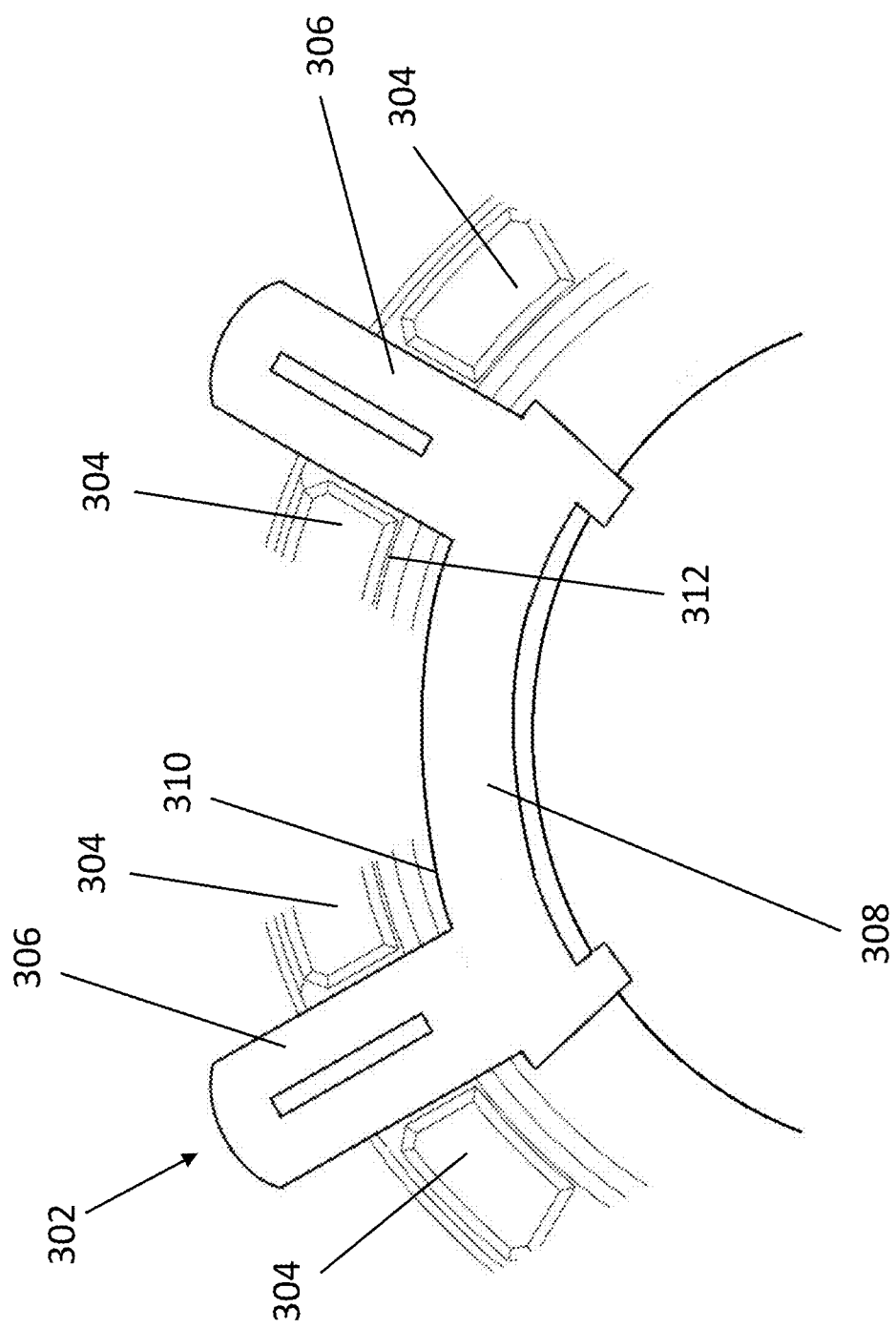

FIG. 9 is a cross-sectional view of another lock pin 302 seated in contact with two pairs of projections 304 that each define a radially extending gap. The lock pin 302 comprises two radial portions 306 along with a circumferential portion 308 that connects the two radial portions 306. The circumferential portion 308 is located radially inwards of the projections 304 and comprises an outer engagement surface 310 which engages with a radially inner engagement surface 312 of two of the projections 304 to prevent radial movement of the lock pin 302.

An alternative lock pin 502 seated between two projections 504 of a rim 505 of an end fitting is illustrated in FIGS. 10a and 10b. The lock pin 502 comprises a main part 509 and a securing part 511. The securing part 511 comprises a cylindrical dowel that extends into both a through-hole in the main part 509 and a cavity 507 formed in the rim 505. The securing part 511 is held in place by a lock nut 510, which is tightened against the rim 505 to prevent axial movement of the main part 509 and the securing part 511. The securing part 511 comprises a first engagement surface 513 and the cavity 507 comprises a second engagement surface 515. Outwards radial movement of the lock pin 502 is prevented by the engagement of the first and second engagement surfaces 513, 515.

FIG. 11 is a cross sectional view of an assembled threaded coupling 602 comprising an end fitting 604, a rod end 606, a lock pin 608 and a lock nut (not shown). The cross sectional view shows an alternative profile of a protrusion 622 of the lock pin 608, disposed within a groove 609 provided in the end fitting 606. In a similar manner to the lock pin described with reference to FIGS. 1-3, the protrusion 622 serves to prevent outwards radial movement of the lock pin 608 by the engagement of an outer engagement surface 610 of the protrusion 622 and a radially inner engagement surface 612 of the groove 609.

FIG. 12 shows a further alternative profile of a protrusion 722 of a lock pin 708, and a corresponding groove 709 within an end fitting 704. The protrusion 722 serves to prevent outwards radial movement of the lock pin 708 by the engagement of an outer engagement surface 710 of the protrusion 722 and a radially inner engagement surface 712 of the groove 709.

FIG. 13 a close up view of an assembled threaded coupling 402 comprising an end fitting 404, a rod end 406, a lock pin 408, a lock nut 410 and a lock wire 411. The lock pin comprises a first through-hole 422 and the lock nut 410 comprises a second through-hole 424, into which the lock wire 411 is inserted to prevent relative movement of the lock nut 410 and lock pin 408. Note that while in this Figure the lock wire 411 is shown with a significant amount of slack, this is merely to aid the description of its configuration and in reality the lock wire 411 contains no additional length to ensure that no relative movement is possible.

The invention claimed is:

1. A threaded coupling comprising:
 a first coupling member, comprising a cylindrical portion which is internally threaded around an axis of rotational symmetry of the cylindrical portion and comprises an open end that defines an opening having an annular rim;
 a second coupling member comprising an externally threaded portion and at least one key cavity; and
 a locking assembly comprising:
  a lock pin; and
  a lock nut;
 wherein:
  the externally threaded portion is arranged to be received through the opening to be threadedly engaged with the internally threaded cylindrical portion to couple the first coupling member to the second coupling member;
  the rim comprises at least one projection that projects in a generally axial direction parallel to the axis of rotational symmetry of the cylindrical portion;
  the lock pin is arranged to, when the first coupling member is coupled to the second coupling member, be seated in contact with the at least one projection and extend into the at least one key cavity;
  the lock nut is arranged to be threaded onto the second coupling member to restrict movement of the lock pin in the axial direction; and
  the lock pin comprises a first engagement surface which is arranged, when the lock pin is seated, to engage a second engagement surface provided by the lock nut or the rim so as to prevent movement of the lock pin in a radial direction, perpendicular to the axial direction, wherein the lock pin comprises a slot to accommodate the at least one projection such that when seated, the slot encloses the at least one projection, wherein the first engagement surface comprises the internal surface of the slot, and the second engagement surface comprises the external surface of the at least one projection.

2. The threaded coupling of claim 1, wherein the first coupling member comprises a plurality of projections, positioned around the rim to form a plurality of gaps between adjacent projections and the lock pin is arranged to be seated at least partially in at least one of these gaps.

3. The threaded coupling of claim 2, wherein the lock pin arranged to be seated in contact with two projections.

4. The threaded coupling of claim 2, wherein the plurality of projections are equally sized and equiangularly spaced around the rim of the cylindrical portion.

5. The threaded coupling of claim 2, wherein at least one of the gaps is tapered and the lock pin is similarly tapered to fit in the at least one of the gaps, wherein the first engagement surface comprises one side of the lock pin and the second engagement surface comprises a side of one of the plurality of projections.

6. The threaded coupling of claim 1, wherein the at least one projection projects a projection distance in the axial direction, and the lock pin has a thickness in the axial direction when seated, that is less than or equal to the projection distance.

7. The threaded coupling of claim 1, wherein the key cavity comprises a keyway extending at least partially along the externally threaded portion.

8. The threaded coupling of claim 1, wherein the lock nut comprises an annular groove, which comprises the second engagement surface, and the lock pin comprises a protrusion which, when the lock pin is seated, is positioned within the annular groove and comprises the first engagement surface.

9. The threaded coupling of claim 1, wherein the first coupling member comprises an annular groove which comprises the second engagement portion, and the lock pin comprises a protrusion which, when the lock pin is seated, is positioned within the annular groove and comprises the first engagement surface.

10. The threaded coupling of claim 1, wherein the lock nut comprises at least a first through-hole through which lock wire may be threaded; the first coupling member, the second coupling member or the lock pin comprises a second through-hole for lock wire and a lock wire is arranged to be inserted, in use, through the first and second through-holes and secured.

11. The threaded coupling of claim 1, wherein the first coupling member comprises connection means for connecting the first coupling member to a structural component made of fibre reinforced polymer matrix composite material.

12. The threaded coupling of claim 11, wherein the connection means comprises a threaded portion, and the first coupling member is arranged to be screwed onto an end of the structural component.

13. The threaded coupling of claim 12, wherein the at least one projection serves as a torque application point for screwing the first coupling member onto the structural component, and optionally the at least one projection is shaped so as to receive a standard torque application tool.

\* \* \* \* \*